R. A. CAMPBELL.
SKID STOP.
APPLICATION FILED NOV. 14, 1912.

1,195,974.

Patented Aug. 29, 1916.

WITNESSES
M. R. McInnis
E. A. Paul

INVENTOR
ROBERT A. CAMPBELL
BY
Paul & Paul
ATTORNEYS

UNITED STATES PATENT OFFICE.

ROBERT A. CAMPBELL, OF MINNEAPOLIS, MINNESOTA.

SKID-STOP.

1,195,974. Specification of Letters Patent. Patented Aug. 29, 1916.

Application filed November 14, 1912. Serial No. 731,298.

*To all whom it may concern:*

Be it known that I, ROBERT A. CAMPBELL, a citizen of the United States, residing at Minneapolis, Hennepin county, Minnesota, have invented certain new and useful Improvements in Skid-Stops, of which the following is a specification.

The object of my invention is to check or stop positively the skidding of a pneumatic tired vehicle after the lateral or sidewise movement has begun.

A further object is to provide a mechanism within control of the driver of the car or vehicle which can be easily and quickly rendered operative for positively stopping the skidding of the car.

A further object is to provide a device which can be easily and quickly applied to the car without altering the construction thereof.

The invention consists generally in various constructions and combinations, all as hereinafter described and particularly pointed out in the claims.

Figure 1:
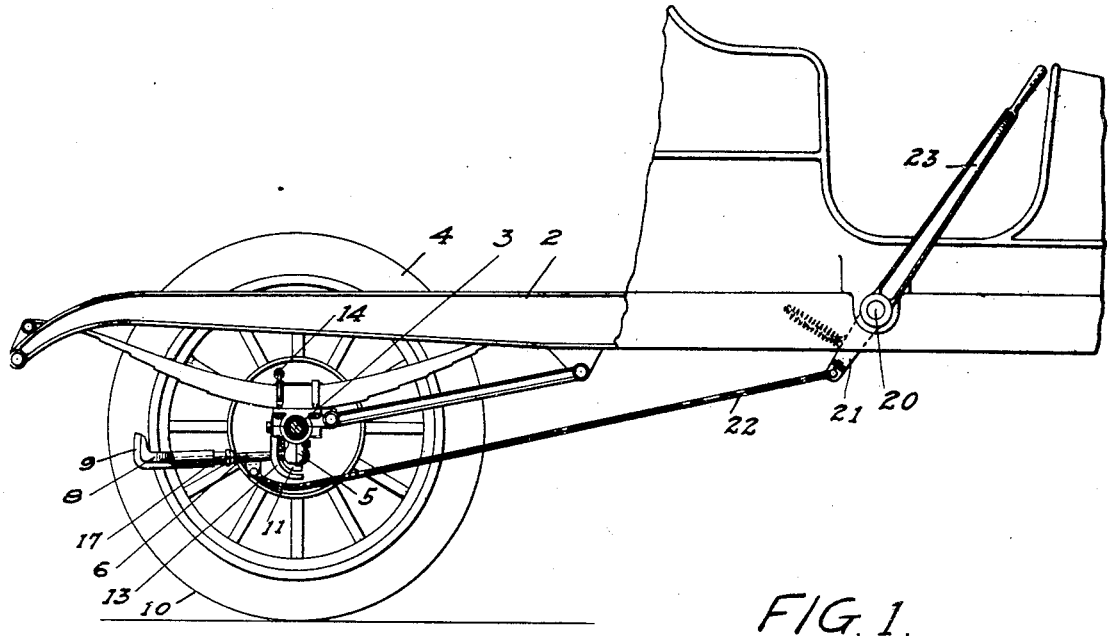
Figures 2, 3:
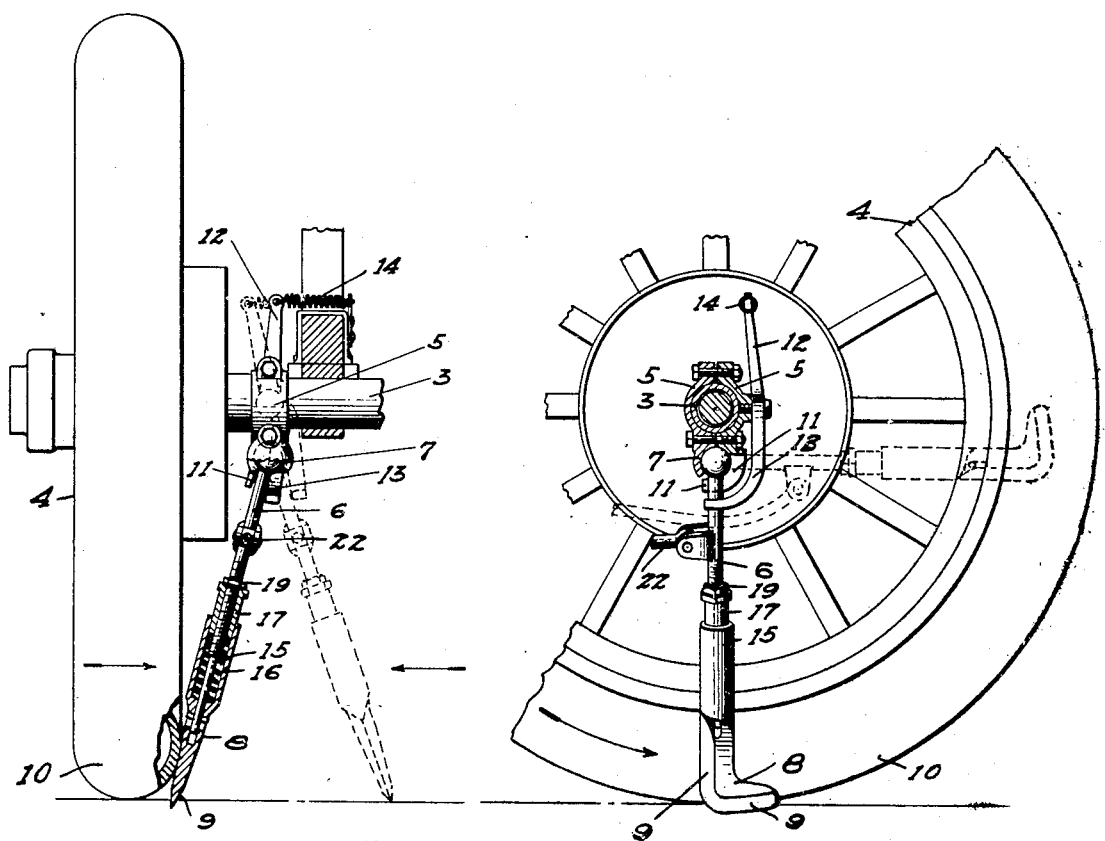

In the accompanying drawings forming part of this specification, Figure 1 is a sectional view of the rear portion of an automobile with my invention applied thereto, Fig. 2 is a detail view showing the device in its inoperative and operative positions, Fig. 3 is a front view in section looking at the edge of the skid-stopping bar or shoe.

In the drawing, 2 represents the frame of an automobile, having an axle 3 and carrying wheels 4.

5 is a clamp mounted on the axle 3 and 6 is a shank having a ball and socket bearing at 7 and capable of movement in a plane parallel with the plane of the wheel and also in a plane at right angles substantially to the plane of the wheel. At the lower end of the shank 6 is a shoe 8 having preferably beveled surfaces 9. This shoe is adapted to contact with the pneumatic tire 10 and be yieldingly supported thereby, the tire forming a backing or buffer for the shoe when it engages the pavement or the surface over which the wheel may be skidding. This arrangement of the shoe will not only make it more effective for stopping the lateral or skidding movement of the car, but it will also eliminate to a large extent the danger of breakage arising from the shoe coming in sudden contact with the pavement.

I have shown but one of the shoes and its support therefor, but it will be understood that a similar device is provided on the opposite side of the car.

The lower portion of the clamp 5 is provided with a cam surface 11 against which the shank 6 is held by a lever 12 having an arm 13 to bear on the shank and a spring 14 with sufficient tension to hold the shank in contact with the cam surface as it swings from a horizontal to a vertical position. The cam surface 11 operates to guide the shank and shoe downwardly and outwardly against the surface of the tire.

The shoe and its supporting shank are preferably made in two parts, as indicated in Fig. 3, the upper portion of the shoe having a socket or recess 15 therein to receive a compression spring 16 and a sleeve 17 is threaded on the shank and adapted to bear on the spring and telescope with the upper portion of the shoe. The sleeve is held in place by a lock nut 19. This spring will yield in case the shoe should catch on a street car rail or other obstruction, when the skidding momentum of the car might be sufficient to break the shoe or shank if it were not for the yielding connection between them. The yielding connection will also allow the shoe on that side toward which the car is skidding to swing inwardly to an inoperative position, while the shoe on the other side of the car will be forced against the inner face of the tire and will positively check the skidding movement.

Any suitable mechanism may be employed for operating the skid stops, but I prefer to provide a jack shaft 20, suitably mounted in the frame of the car, and having arms 21 thereon connected by rods 22 with the shanks 6 of the skid stops. A lever 23 is mounted on the jack shaft and by throwing this lever backward the driver of the car can swing the shank 6 from a substantially horizontal or inoperative position, (shown in Fig. 1) to a vertical or operative position beneath the axle. The spring-actuated lever 12 tends to hold the shank 6 and its shoe toward the surface of the tire, but it also allows the shank to swing inwardly on its bearing, the shoe and shank telescoping sufficiently to allow the shoe to pass beneath the center of the bearing. I am thus able to avoid the danger of overturning the car in case of sudden stoppage. Evidently this overturning would be more likely to occur when the shoe became operative on that side toward which the car was skidding. For instance, if the car began to skid toward the right, the engagement of the right hand shoe with the ground or pavement would have a tendency to tip the car, while if the shoe on the opposite side of the car became operative it would positively stop the skidding movement without any danger of overturning the car. This function of the device I am able to bring about by means of the ball and socket bearing and the spring-actuated lever, as described.

I have shown the invention applied to the rear axle and wheels, but obviously it is also capable of application to the forward axle if preferred.

I claim as my invention:—

1. The combination, with an axle and wheels, of a skid stop device movable to and from the road-way in a plane substantially parallel with the path of travel of the vehicle and capable of movement laterally into and out of engagement with a wheel.

2. The combination, with an axle and wheels therefor, of a skid stop device movable to and from the road-way in a plane substantially parallel with the path of travel of the vehicle and also capable of movement laterally into and out of engagement with a wheel and having a lower cutting edge to engage the road-way and inclined inwardly with respect to the plane of the wheel when in contact therewith.

3. The combination, with an axle and wheels therefor, of a skid-stop device comprising a shoe having a shank pivotally connected with said axle and adapted to swing lengthwise of said axle from one side of its pivotal connection to the other side thereof, said shoe on the outer side of its pivotal connection contacting with the wheel tire and having a lower edge to dig into the roadway, and means for yieldingly holding said shoe in contact with said tire and road-way.

4. The combination, with an axle and wheels therefor, having pneumatic tires, of a skid stop device including pivoted shanks and shoes having surfaces to contact with the ground or pavement, said shoes having yielding connections with said shanks, means for directing said shanks and shoes outwardly to an operative position and into contact with said tires, and means for operating said shanks simultaneously.

5. The combination, with an axle and wheels therefor having pneumatic tires, of shanks having ball and socket bearings on said axle, shoes to contact with the ground or pavement, means for swinging said shanks and shoes from a normal horizontal position to a substantially upright or vertical position, and means for directing said shanks outwardly during such swinging movement.

6. The combination, with an axle and carrying wheels therefor, of shanks having ball and socket bearings on said axle and adapted to swing in planes parallel substantially with the plane of the wheels and also to swing in a direction at right angles substantially to the plane of the wheels, said shanks having bearing shoes, means for normally swinging said shanks and shoes outwardly toward said wheels and means for swinging said shanks to an operative or an inoperative position.

7. The combination, with an axle having carrying wheels, of shanks having ball and socket bearings on said axles, and shoes adapted to contact with the pavement or the ground, spring-pressed levers arranged to exert a yielding pressure on said shanks to force them outwardly toward said wheels, and means for swinging said shanks in planes parallel substantially with the planes of said wheels.

8. An anti-skid device for vehicles comprising a plate movable to and from the roadway in a plane substantially parallel with the path of travel of the vehicle and capable of movement laterally into and out of engagement with the supporting member of the vehicle independent of its movement to and from the roadway.

In witness whereof, I have hereunto set my hand this 7th day of November, 1912.

ROBERT A. CAMPBELL.

Witnesses:
GENEVIEVE E. SORENSEN,
EDWARD A. PAUL.